Figure 1:
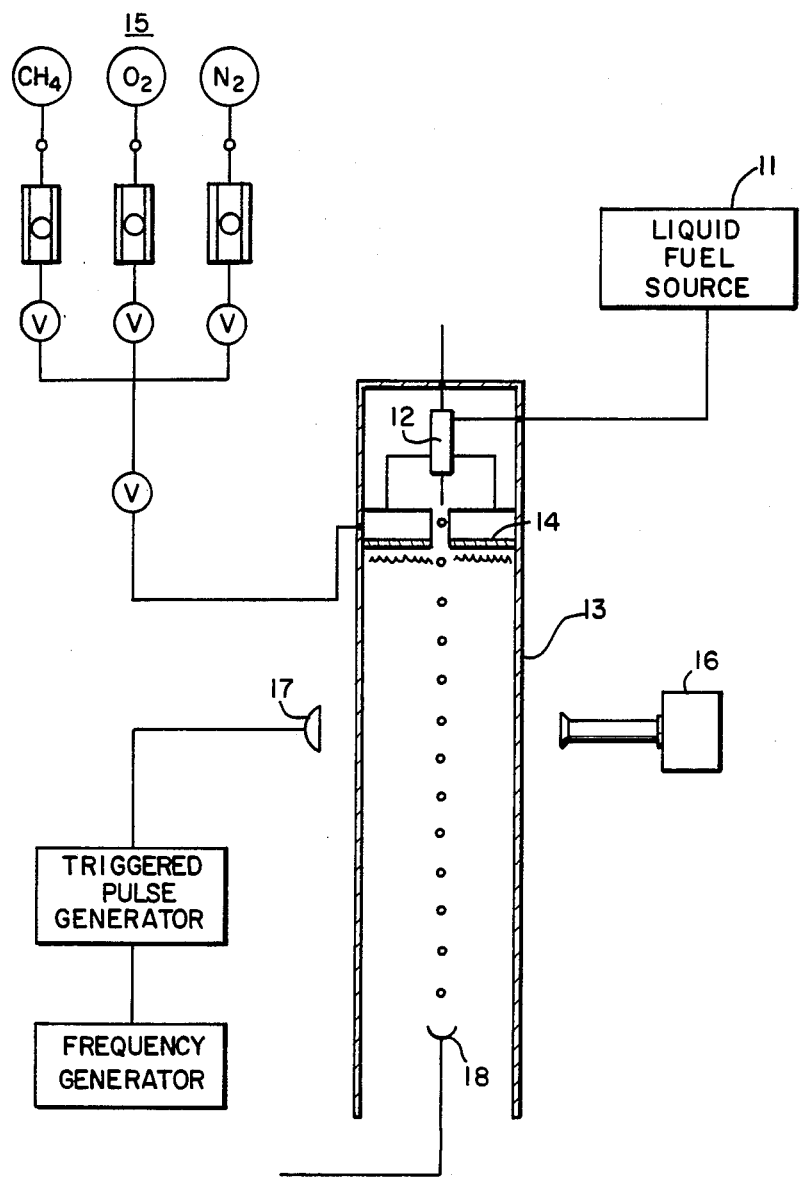
Figure 2:
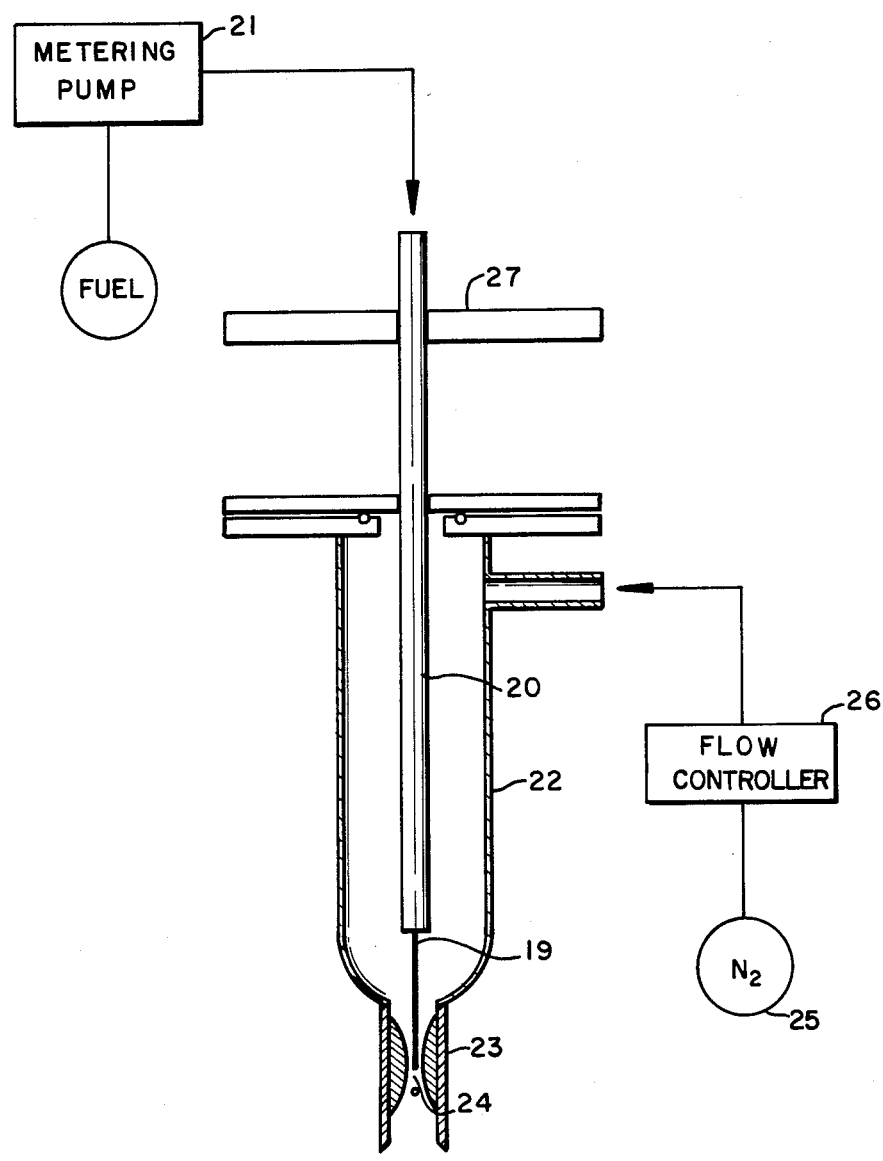

United States Patent [19]

Green et al.

[11] Patent Number: 4,717,049
[45] Date of Patent: Jan. 5, 1988

[54] DROPLET GENERATING APPARATUS

[75] Inventors: Gary J. Green, Yardley, Pa.; Frederick L. Dryer, Pennington, N.J.; Dennis E. Walsh, Richboro, Pa.

[73] Assignee: Mobil Oil Corporation, New York, N.Y.

[21] Appl. No.: 917,288

[22] Filed: Oct. 9, 1986

Related U.S. Application Data

[63] Continuation of Ser. No. 596,990, Apr. 5, 1984, abandoned.

[51] Int. Cl.$^4$ ............................................. B65D 47/18
[52] U.S. Cl. ....................................... 222/420; 261/76
[58] Field of Search ................ 222/571, 255, 262, 263

[56] References Cited

U.S. PATENT DOCUMENTS

| | | | |
|---|---|---|---|
| 3,489,396 | 1/1970 | D'Aragon | 261/25 |
| 3,677,447 | 7/1972 | Rentz | 222/420 |
| 3,731,850 | 5/1973 | Weitzel | 222/420 |
| 3,979,334 | 9/1976 | Lee et al. | 252/448 |
| 4,441,532 | 4/1984 | Hrubesh | 222/420 |
| 4,446,993 | 5/1984 | Tokorezawa | 222/420 |

FOREIGN PATENT DOCUMENTS

| | | | |
|---|---|---|---|
| 1068223 | 9/1957 | Fed. Rep. of Germany | 261/76 |
| 2045390 | 3/1972 | Fed. Rep. of Germany | 222/420 |
| 2259521 | 6/1973 | Fed. Rep. of Germany | 222/420 |
| 1411783 | 7/1964 | France | |
| 286273 | 2/1953 | Sweden | 222/420 |
| 1311285 | 3/1973 | United Kingdom | |
| 1039539 | 9/1983 | U.S.S.R. | 261/76 |

OTHER PUBLICATIONS

"Combustion Rates of Freely Falling Fuel Drops in a Hot Atmosphere", J. A. Bolt et al., Sixth Symposium International on Combustion, pp. 40, 46, the Combustion Institute, 1957.
K. Riel, "An apparatus for the Production of Uniform Sized Water Drops, at Desired Time Intervals", vol. 40, No. 4, Apr. 1969.
Evaporation and Combustion of Single Fuel Droplets in a Hot Atmosphere, M. A. Saad, Doctoral Dissertation Series Publ. No. 21,335, University of Michigan, 1956.
W. R. Lane, "A Microbutte for Producing Small Liquid Drops of Known Size", Journal of Scientific Instruments, vol. 24, Apr. 1947, pp. 98-101.
"A Theoretical and Experimental Investigation of the Ignition of Fuel Droplets", J. J. Sangiovanni et al., Combustion Science and Technology, vol. 16, pp. 59-70, 1979.
"Initial Observations on the Free Droplet Combustion Characteristics of Water-In-Fuel Emulsions", J. C. Lasheras, et al., Combustion Science and Technology, vol. 2, pp. 1-14, 1979.
"An Experimental Investigation of the Gasification Mechanism of Freely-Falling Multicomponent Droplets", C. H. Wang, et al., Paper No. 82-81, Fall Western States Meeting, The Combustion Institute, Sandia Laboratories, Livermore, CA, Oct. 11-12, 1982.

*Primary Examiner*—Joseph J. Rolla
*Assistant Examiner*—Kenneth Noland
*Attorney, Agent, or Firm*—Alexander J. McKillop; Michael G. Gilman; Charles J. Speciale

[57] ABSTRACT

Uniform droplets of a liquid are produced by positioning the end of a capillary tube in the throat of a venturi. Gas flowing through the venturi detaches droplets from the end of the capillary tube without requiring high volume gas flow or excessively high velocity of the droplets.

10 Claims, 7 Drawing Figures

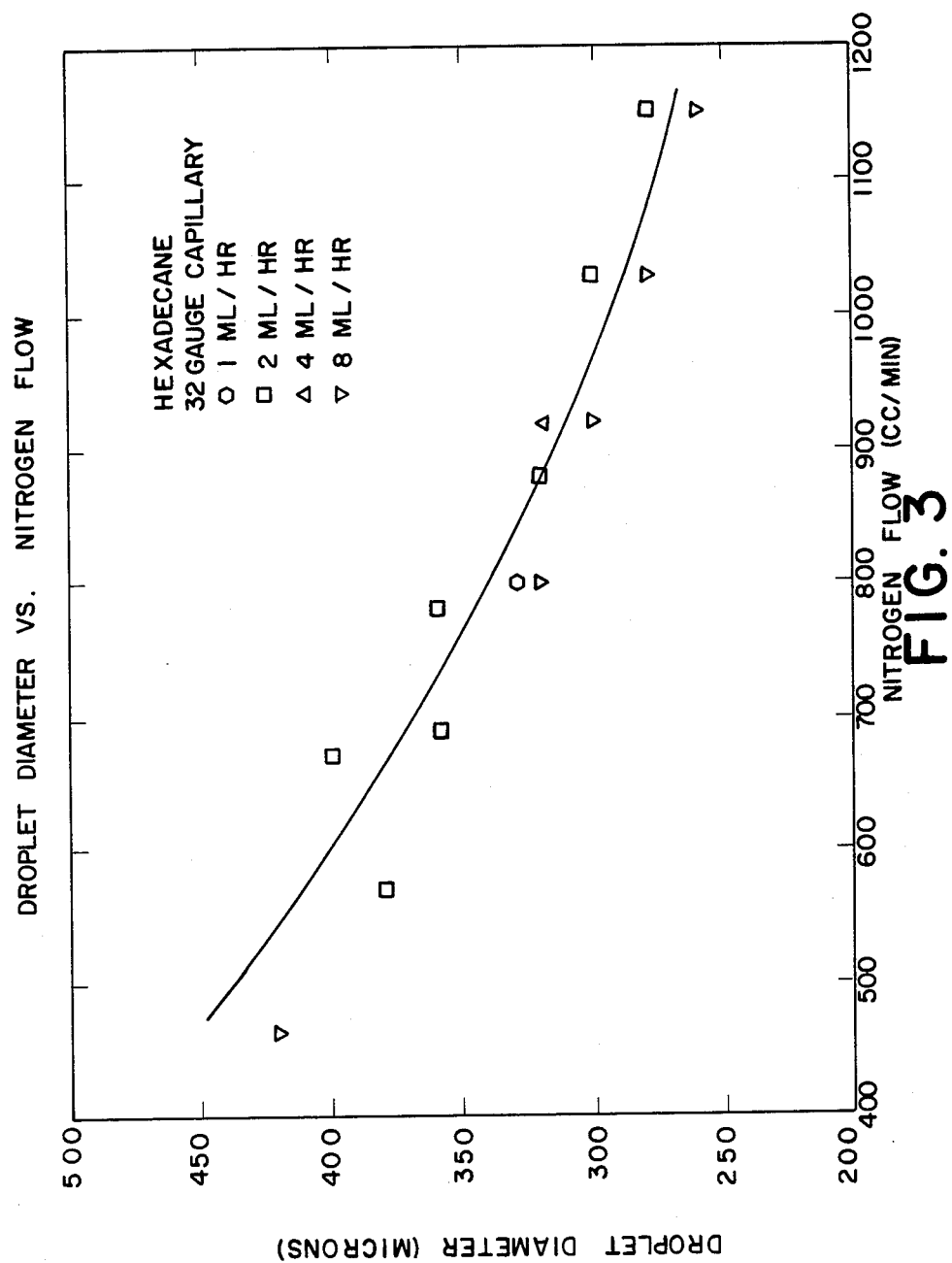

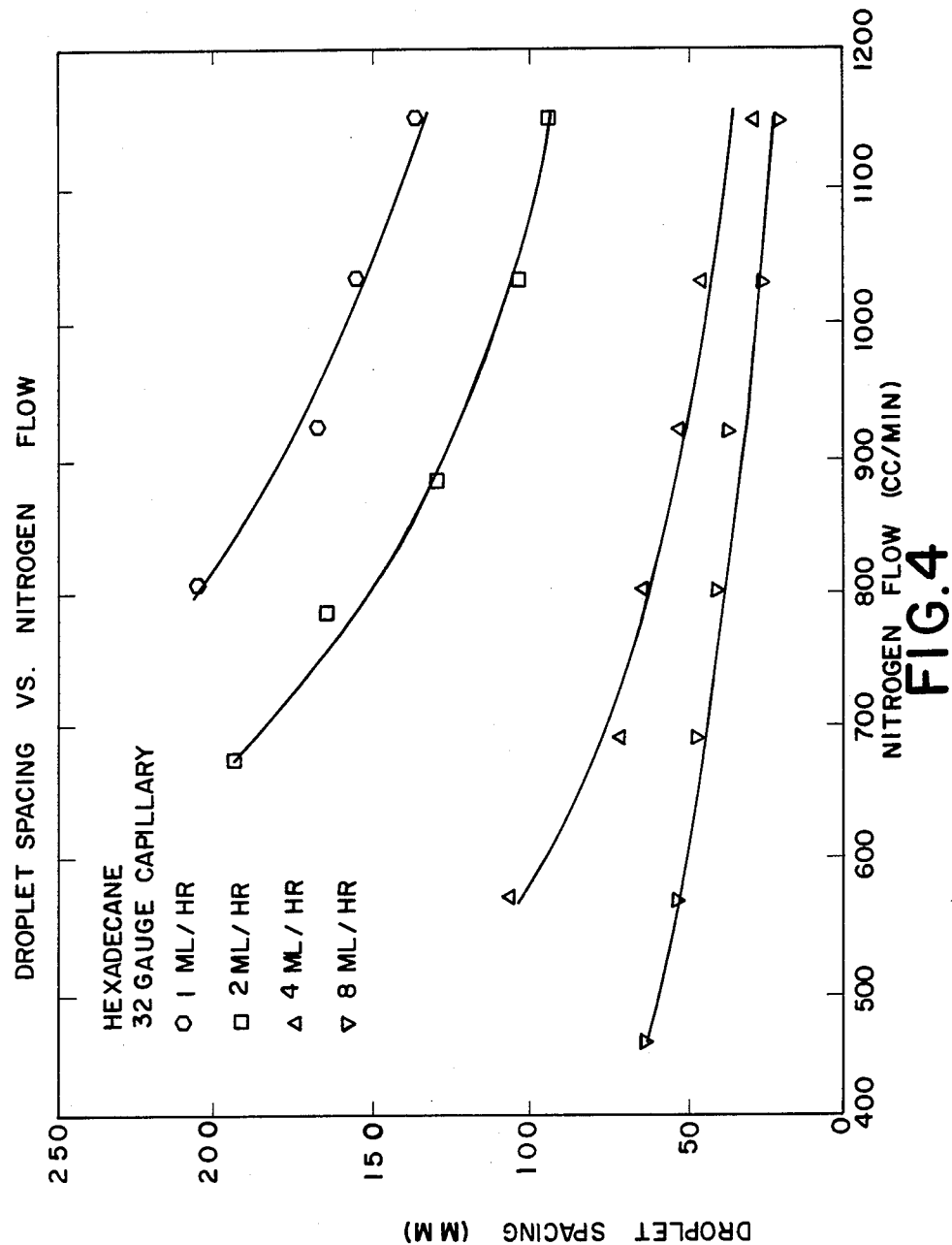

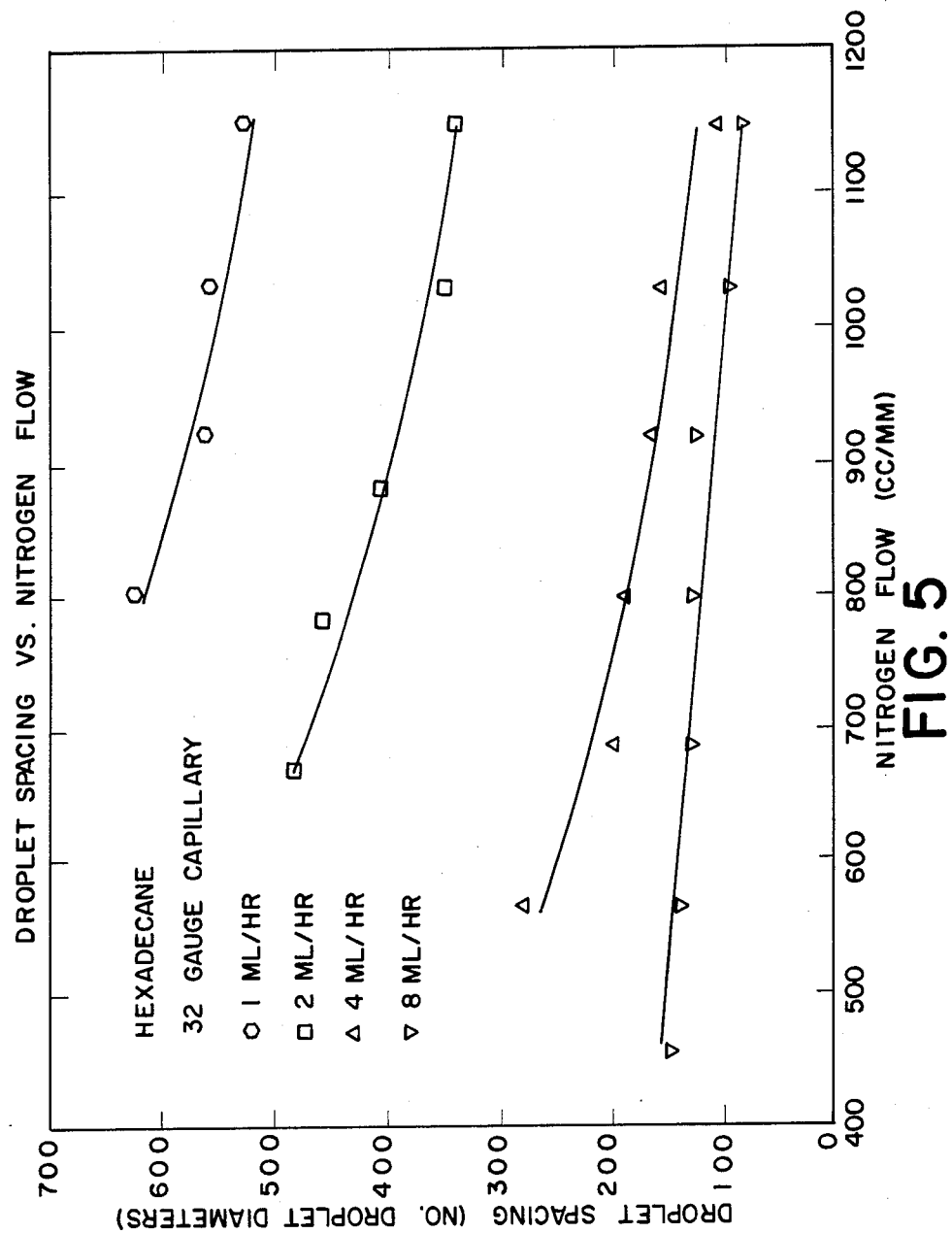

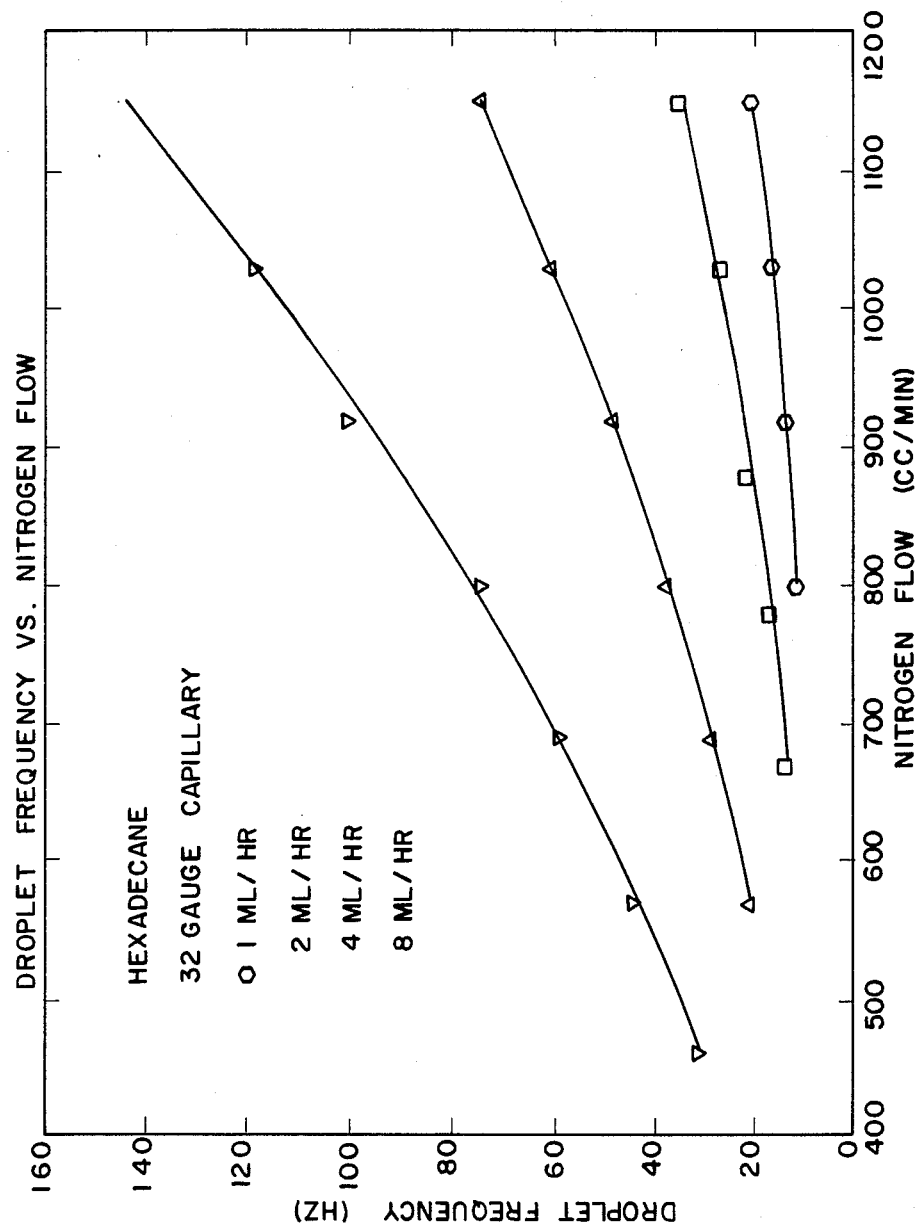

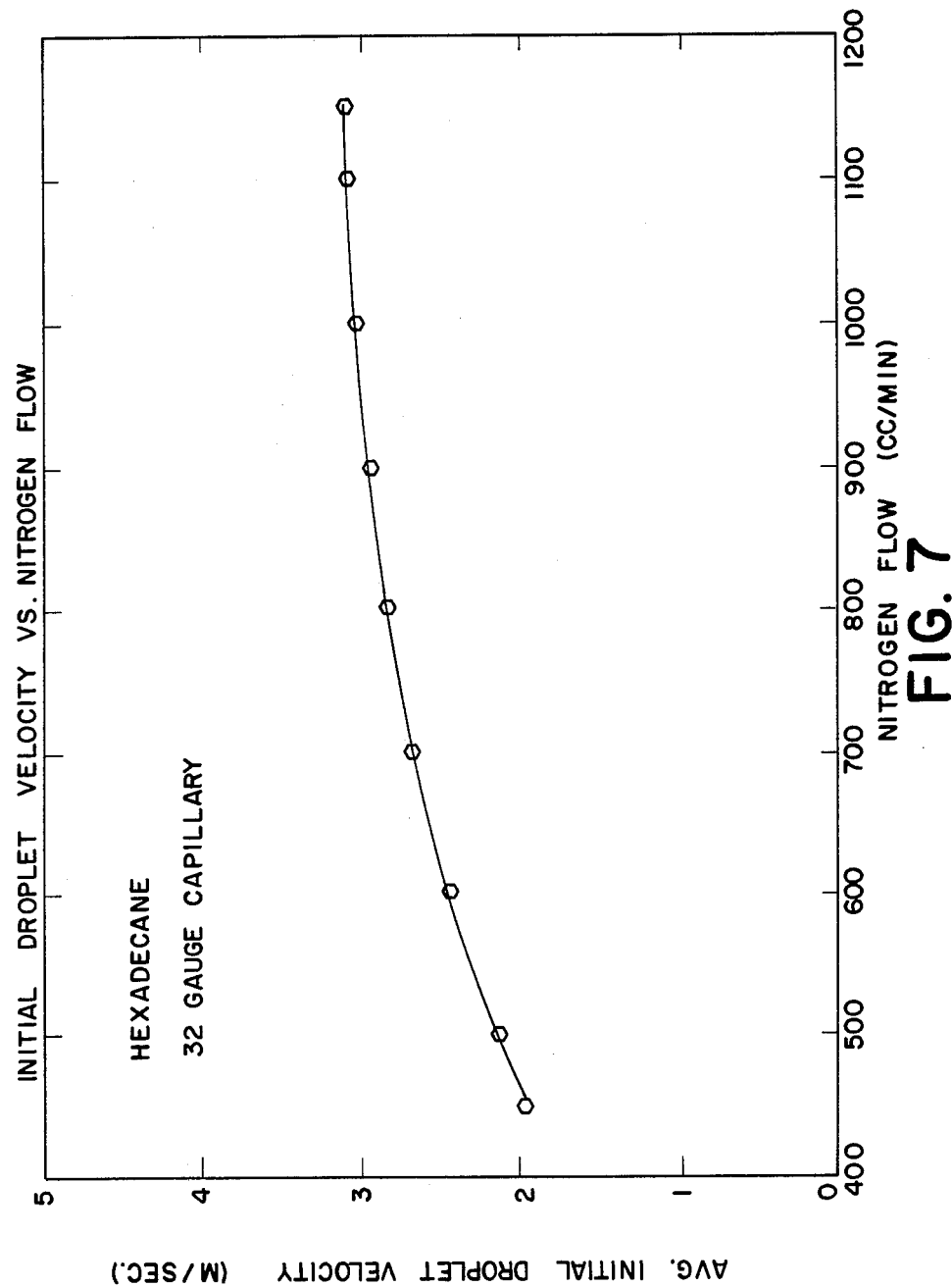

DROPLET GENERATING APPARATUS

This is a continuation of copending application Ser. No. 596,990, filed on Apr. 5, 1984, now abandoned.

BACKGROUND OF THE INVENTION

This invention relates to the generation of small, widely spaced droplets of uniform size and more particularly, to the generation of such droplets by placing the end of a capillary tube in a venturi throat.

A need exists in laboratory experimentation and in scientific analyses for the production of a stream of uniform, isolated droplets of liquid. Streams of small, uniformly-sized droplets are required, for example, in testing aerosol standards for environmental toxicological studies, ink jet printing methods, new nebulization techniques for flame atomic absorption spectroscopy, novel means for investigating fast chemical reaction kinetics, and new approaches to studying the combustion behavior of fuels. Several techniques are currently used for producing streams of small uniform droplets suitable for such applications. See, for example, J. J. Sangiovanni and A. S. Kestin, Combustion Science and Technology 16, 59 (1977); J. C. Lasheras, A. C. Fernandez-Pello, and F. L. Dryer, Combustion Science and Technology 21, 1 (1979); C. H. Wang, X. Q. Liu and C. K. Law, Paper No. 82-81, Fall Western States Meeting, The Combustion Institute, Sandia Laboratories, Livermore, CA Oct. 11–12, 1982.

The prior art includes Rayleigh instability and mechanical chopping techniques of producing droplets which rely on physically breaking up an established high velocity liquid jet by electromagnetically induced mechanical vibrations or high speed rotary shuttering, respectively. Piezoelectric techniques can be used to expel droplets by mechanical constrictions applied to a liquid reservoir. The use of moving parts or electronic components for the production of droplets gives rise to the possibility of component failure, or drift, which adversely affects repeatability with time.

A major restriction to the use of Raleigh instability for exploring isolated droplet combustion is the limited droplet spacing inherently available. However, no alternative droplet generation techniques (e.g., mechanical chopping or piezoelectric techniques) producing well-spaced ($\geqq 30$ droplet diameters) droplets have been described which are adaptable for use in combustion apparatus without introducing significant experimental complexities. J. A. Bolt and M. A. Saad, "Combustion Rates of Freely Falling Fuel Droplets in a Hot Atmosphere", Sixth Symposium (International) on Combustion, p. 717, The Combustion Institute, 1957, describes an apparatus for forming fuel droplets by a small bore tube from which the drops are thrown by a concentric jet of air. Droplet size is controlled by capillary bore size, pressure of the concentric air head, head of the fuel and the distance the capillary protrudes beyond the air nozzle. Resultant droplets are $\approx 1.1$ mm in diameter, much larger than those found in typical combustion systems. In the laboratory, as well as practical combustion devices, there exists a limited droplet residence time within the combustor during which complete burnout must be achieved. Very large droplets (such as those described above) would require inordinately large combustion chambers to approach complete or nearly complete burnout. Note that the device of Bolt and Saad resulted in droplets which burned to $\approx 300\mu$ diameter over the length of their combustor, far from complete burnout.

It is an object of the invention to provide apparatus for producing uniform droplets of controlled, substantially smaller size in which the droplet spacing, and initial velocity can be regulated.

SUMMARY OF THE INVENTION

In accordance with the present invention droplets are induced by a venturi throat which produces high velocity gas flow to detach uniform droplets from the end of a capillary tube. In accordance with the invention, the venturi includes a converging-diverging nozzle which forms droplets with good trajectory, and with the desired droplet size and spacing. The present invention alleviates problems associated with prior art apparatus including problems of droplet size and spacing, restricted operating ranges, significant liquid volume requirements, and cost and complexity of the apparatus found in the prior art.

The foregoing and other objects, features and advantages of the invention will be better understood from the following more detailed description and appended claims.

DESCRIPTION OF THE DRAWINGS

FIG. 1 shows the droplet producing apparatus of the present invention in a system for measuring the combustion of fuel;

FIG. 2 shows the droplet generation device of the present invention;

FIG. 3 shows droplet diameter versus nitrogen flow in an exemplary practice of the invention;

FIG. 4 shows droplet spacing versus nitrogen flow in an exemplary practice of the invention;

FIG. 5 shows droplet spacing versus nitrogen flow in an exemplary practice of the invention;

FIG. 6 shows droplet frequency versus nitrogen flow; and

FIG. 7 shows initial droplet velocity versus nitrogen flow in an exemplary practice of the invention.

DESCRIPTION OF THE PREFERRED EMBODIMENT

FIG. 1 depicts a source of liquid fuel 11 to be tested. The liquid fuel is supplied to the droplet generation device 12 of the present invention.

Droplets are produced in the combustion duct 13 which has a flat flame burner 14 supplied with fuel, oxygen and nitrogen from the sources shown at 15.

Optical detection of the combustion process is performed by a detector 16 such as a camera or optical probe, and a triggered light source 17. The residue of the combustion process is collected in sample collection probe 18.

Referring to FIG. 2, the droplet generation device of the present invention includes a capillary tube 19 having a liquid receiving end which is connected to the tube 20 which contains fuel from the metering pump 21. An outer concentric tube 22 has a venturi 23 at the bottom thereof. The tip of capillary tube 19 is positioned in the throat 24 of the venturi 23.

Venturi 23 is a converging-diverging nozzle with the diverging nozzle section having a half angle of 7.5 degrees in an exemplary embodiment. The converging-diverging nozzle insures a better trajectory of the droplets than other venturis.

Nitrogen gas from source 25 is supplied through flow controller 26 which regulates the flow of gas through the venturi to control the formation of droplets from the tip of the capillary tube. By varying the liquid flow, gas flow, and capillary size, the droplet size, spacing, frequency and initial velocity may be precisely controlled.

A stream of droplets is produced by inducing premature detachment of incompletely formed droplets at the tip of the capillary 19. This detachment is accomplished by drag caused by the annular flow of gas past the capillary tip which is positioned in the throat 23 of the venturi. The gas is accelerated past the tip of the capillary by the venturi and then decelerated upon exit from the throat of venturi 23. Droplets thus formed are much smaller in diameter than those that would result from natural detachment due to the weight of the droplet overcoming the interfacial tension at the capillary tip.

Precise metering of the liquid flow is controlled by the metering pump 21 and flow controller 26 accurately controls gas flow.

Accurate positioning of the capillary tip with respect to the venturi is accomplished with a micrometer driven translation stage 27. In an exemplary embodiment of the invention, a 32-gauge (0.004" inside diameter) stainlesss steel capillary was positioned in the throat of a venturi of approximately 1 mm inside diameter.

The critical relationship between the size of the venturi throat and the diameter of the capillary tube will depend on the type of droplets to be produced. For the testing of fuels as described herein, the capillary tube 19 has an inside diameter in the range of about 0.001" to 0.035" and outside diameter of 0.005" to 0.05". The outer concentric tube 22 has an inside diameter in the range of 0.1" to 2", and the throat of the venturi 23 has an inside diameter in the range of 0.01" to 0.075", and a throat length in the range of 0.03" to 0.3".

Droplet characterization was carried out by a helium-neon laser aligned to intersect the path of the droplet stream. Scattered laser light from the droplets passing through the beam was detected with a photodiode miniprobe. Resultant modulated photodiode output signal was monitored with an oscilloscope to yield directly the droplet frequency, i.e., the rate of droplet production. The output signal was also supplied to a strobe lamp used to synchronously back illuminate the droplet stream for visual observation and photographs which accurately measure droplet size and spacing.

The appearance of a hexadecane droplet emerging from the tip of the device was spherical and relatively well centered with respect to the tip. The extent of droplet spacing available with the present invention was shown by droplets spaced by 100 droplet diameters, a spacing 20-50 times greater than that obtained via Rayleigh instability techniques. The relationships between droplet size, spacing, and frequency associated with the current technique are distinctly different from those observed with the Rayleigh instability technique.

By observing droplet diameter and spacing for a variety of liquid and gas flow rates, the results depicted in FIGS. 3, 4, and 5 were obtained. FIG. 3 shows that droplet diameter decreases with increasing nitrogen flow past the capillary tip, relatively independently of the liquid flow rate through the capillary. FIG. 4 shows that inter-drop spacing also decreases with increased nitrogen flow. The magnitude of the spacing, however, clearly depends on the rate of liquid flow through the capillary, viz. for a given nitrogen flow, the droplet spacing decreases with increasing liquid flow. FIG. 5 presents the droplet spacing data shown in FIG. 4 in terms of numbers of droplet diameters separating individual droplets. It is evident that droplet spacings from 100 to 600 droplet diameters may be achieved by simply varying the flow conditions across the ranges indicated in the figure.

The frequency of production of the resultant droplets as a function of operating parameters is illustrated in FIG. 6. Droplet frequency increases with increasing nitrogen flow and also increases with increasing liquid flow. The relatively low frequencies of 10-150 Hz produced in the invention should be contrasted to the 500-2000 Hz production rates observed in previous work on the Rayleigh instability technique. The low droplet production rates coupled with the relatively low liquid flow rates (<10 ml/hr) in the current device offer the advantage of greatly reduced liquid requirements compared to the Rayleigh instability technique which required 200-400 ml/hr liquid flow.

The initial velocity of droplets produced was also determined as a function of liquid and nitrogen flow by multiplying the initial droplet spacing by the droplet frequency. The collective results are plotted as a single curve in FIG. 7 and show that the initial droplet velocity has a mild dependence on nitrogen flow, gradually increasing with increasing flow. There is no clear dependence on liquid flow rate from the present data. Average initial droplet velocities are 2-3 m/s, comparable to those obtained with the Rayleigh instability technique and suitable for low Reynolds number studies of isolated droplet combustion in the current droplet combustion device.

Studies with light No. 6 marine fuel have shown nominally the same behavior in terms of droplet size, spacing, frequency and velocity.

While a particular embodiment of the invention has been shown and described, various modifications are within the true spirit and scope of the invention. The claims are, therefore, intended to cover all such modifications.

What is claimed is:

1. Apparatus for producing uniform droplets of a liquid comprising:
    a capillary tube having a liquid receiving end and an open tip;
    means for supplying and controlling the flow of said liquid to said receiving end;
    an outer concentric tube having a converging-diverging venturi nozzle at the bottom thereof, the tip of said capillary tube being positioned in the throat of said venturi;
    a source of gas supplied to said outer tube; and
    means for regulating the flow of gas through said venturi nozzle to control the formation of droplets from the tip of said capillary tube.

2. The apparatus recited in claim 1 wherein the means for supplying and controlling said liquid comprises a metering pump.

3. The apparatus recited in claim 1 wherein said gas is nitrogen.

4. A system for measuring the combustion of liquid fuel comprising:
    a combustion duct;
    a burner in said duct, and apparatus for producing uniform droplets positioned at the top of said burner to form a stream of droplets which pass through said burner and said combustion duct, said apparatus including:

a capillary tube having a liquid fuel receiving end and an open tip;

means for supplying and controlling the flow of said liquid fuel to said receiving end;

an outer concentric tube having a candering diverging venturi nozzle at the bottom thereof, the tip of said capillary tube being positioned in the throat of said venturi;

a source of gas supplied to said outer tube; and means for regulating the flow of gas through said venturi to control the formation of droplets from the tip of said capillary tube.

5. The system and apparatus of claim 4 further comprising:

an optical detection system for recording the optical characteristics of the combustion of said stream of droplets.

6. The apparatus of claim 4 wherein said capillary tube has an inside diameter in the range of 0.001" to 0.035" and an outside diameter in the range of 0.005" to 0.05", said outer concentric tube has an inside diameter in the range of 0.1" to 2.0", and said throat of said venturi nozzle has an inside diameter in the range of 0.01" to 0.075" and a length in the range of 0.03" to 0.3".

7. Apparatus for producing uniform droplets of a liquid for testing the combustion properties of liquid fuel comprising:

a capillary tube having a liquid receiving end and an open tip;

means for supplying and controlling the flow of said liquid to said receiving end;

an outer concentric tube having a converging-diverging venturi nozzle at the bottom thereof, the tip of said capillary tube being positioned in the throat of said venturi;

a source of gas supplied to said outer tube; and means for regulating the flow of gas through said venturi nozzle to control the formation of droplets from the tip of said capillary tube;

wherein said capillary tube has an inside diameter in the range of 0.001" to 0.035" and an outside diameter in the range of 0.005" to 0.05", said outer concentric tube has an inside diameter in the range of 0.1" to 2.0", and the throat of said venturi nozzle has an inside diameter in the range of 0.01" to 0.075" and a length in the range of 0.03" to 0.3".

8. The apparatus of claim 7 further comprising:

a combustion duct positioned beneath said tip of said capillary tube; and a burner positioned in said combustion duct.

9. Apparatus for producing uniform droplets of a liquid comprising:

a capillary tube having a liquid receiving end and an open tip, said capillary having an inside diameter in the range of 0.001" to 0.035", and an outside diameter in the range of 0.005" to 0.05";

means for supplying and controlling the flow of said liquid to said receiving end;

an outer concentric tube having a converging-diverging venturi nozzle at the bottom thereof, the tip of said capillary tube being positioned in the throat of said venturi nozzle, said outer concentric tube having an inside diameter in the range of 0.1" to 2.0" and wherein the throat of said venturi nozzle has an inside diameter in the range of 0.01" to 0.075", and a length in the range of 0.03" to 0.3".

10. The apparatus of claim 9 further comprising:

a combustion duct positioned beneath said tip of said capillary tube; and a burner positioned in said combustion duct.

* * * * *